(12) United States Patent
Itoh

(10) Patent No.: US 8,477,988 B2
(45) Date of Patent: Jul. 2, 2013

(54) IMAGE PROCESSING APPARATUS, IMAGE FORMING APPARATUS AND COMPUTER READABLE MEDIUM

(75) Inventor: Atsushi Itoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1198 days.

(21) Appl. No.: 12/357,802

(22) Filed: Jan. 22, 2009

(65) Prior Publication Data
US 2010/0067785 A1    Mar. 18, 2010

(30) Foreign Application Priority Data
Sep. 17, 2008   (JP) ................................. 2008-237524

(51) Int. Cl.
*G06K 9/00*   (2006.01)
(52) U.S. Cl.
USPC ........................................................ 382/100
(58) Field of Classification Search
USPC ......................................... 382/100, 181–231
See application file for complete search history.

(56) References Cited

U.S. PATENT DOCUMENTS

| | | | | |
|---|---|---|---|---|
| 5,481,375 | A * | 1/1996 | Eto et al. ....................... | 358/450 |
| 5,649,026 | A * | 7/1997 | Heins, III ...................... | 382/175 |
| 5,654,807 | A * | 8/1997 | Miyaza ......................... | 358/450 |
| 5,751,854 | A * | 5/1998 | Saitoh et al. .................. | 382/218 |
| 6,104,036 | A * | 8/2000 | Mazowiesky ................. | 250/556 |
| 2002/0039207 | A1 | 4/2002 | Kanda | |
| 2002/0168108 | A1* | 11/2002 | Loui et al. ..................... | 382/190 |
| 2003/0169899 | A1* | 9/2003 | Slepyan et al. ............... | 382/100 |
| 2005/0012967 | A1 | 1/2005 | Okamura | |
| 2005/0040225 | A1* | 2/2005 | Csulits et al. ................. | 235/379 |
| 2008/0075366 | A1 | 3/2008 | Jin | |
| 2009/0002784 | A1* | 1/2009 | Morikawa ..................... | 358/520 |

FOREIGN PATENT DOCUMENTS

| | | |
|---|---|---|
| JP | A 60-197062 | 10/1985 |
| JP | A 7-147634 | 6/1995 |
| JP | A 11-266352 | 9/1999 |
| JP | A 11-298665 | 10/1999 |
| JP | A 11-344317 | 12/1999 |
| JP | A-2001-313830 | 11/2001 |
| JP | A 2004-328679 | 11/2004 |
| JP | A-2006-140762 | 6/2006 |
| JP | A 2006-270306 | 10/2006 |

OTHER PUBLICATIONS

Office Action issued in corresponding Japanese Application No. 2008-237524, mailed Jun. 29, 2010. (with English-language translation).

European Search Report issued in corresponding European Application No. 09163391.7, mailed Dec. 23, 2009.

(Continued)

*Primary Examiner* — Alex Liew
(74) *Attorney, Agent, or Firm* — Oliff & Berridge, PLC

(57) ABSTRACT

An image processing apparatus has a read image acquisition section and a specific image region extraction section. The read image acquisition section acquires read image data which is obtained by reading a front face and a rear face of a document. The specific image region extraction section extracts, as a specific image region, from among local regions existing at corresponding positions of the front face and the rear face of the read image data, a local region in which an amount of difference of at least one of hue degree, brightness degree or saturation degree between the front face and the rear face is within a predetermined range.

18 Claims, 12 Drawing Sheets

OTHER PUBLICATIONS

Office Action issued in JP 2008-237524, mailed Feb. 8, 2011. (with English-language translation).

Mar. 23, 2010 Office Action issued in Australian Patent Application No. 2009202451.

* cited by examiner

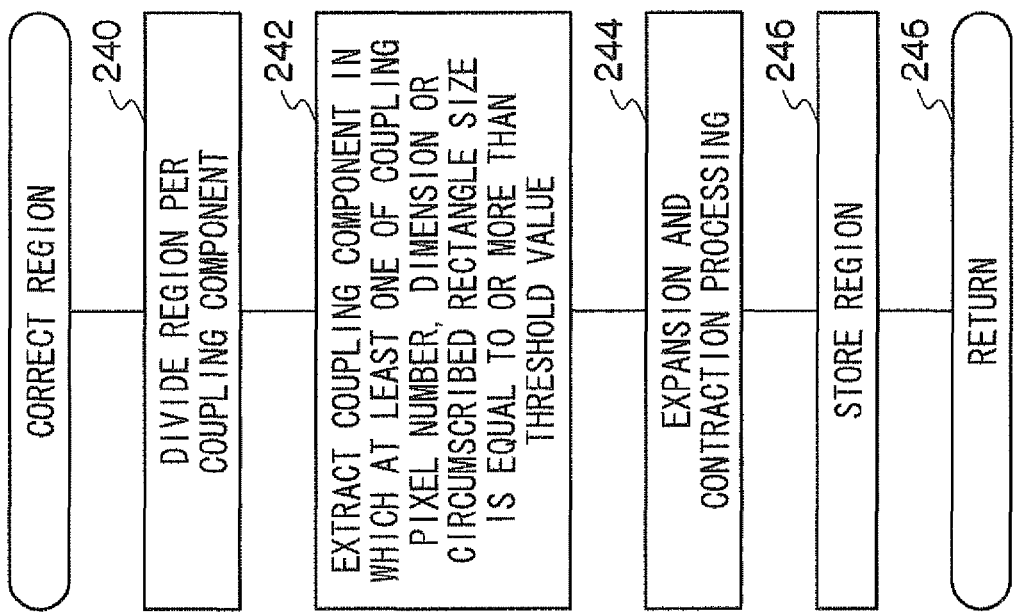
FIG. 3C / FIG. 3B / FIG. 3A

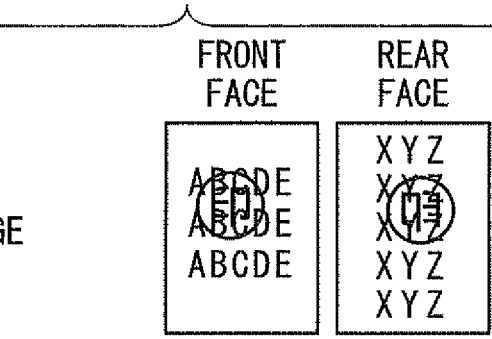
FIG. 4A  READ IMAGE
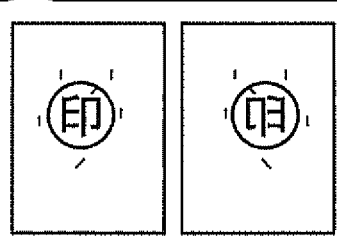
FIG. 4B  SPECIFIC IMAGE REGION EXTRACTION
FIG. 4C  SMOOTHING
FIG. 4D  BINARIZATION
FIG. 4E  EXPANSION → CONTRACTION
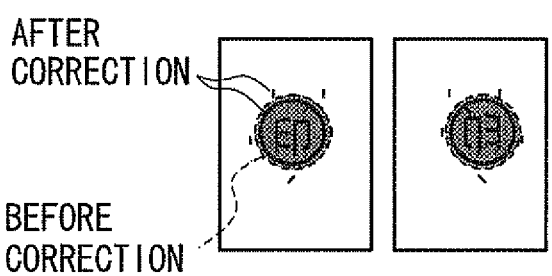
FIG. 4F
IMAGE REGION CORRECTION
AFTER CORRECTION
BEFORE CORRECTION

FIG. 11

STEP 100
↓
DETECT BACKGROUND COLOR — 110
↓
CARRY OUT COLOR CORRECTION OF FOREGROUND COLOR ON THE BASIS OF DETECTED BACKGROUND COLOR — 112
↓
STEP 120

READ IMAGE

RESULTS OF BINARIZATION

EXTRACT BACKGROUND COLOR

IMAGE PROCESSING APPARATUS, IMAGE FORMING APPARATUS AND COMPUTER READABLE MEDIUM

CROSS-REFERENCE TO RELATED APPLICATIONS

This application is based on and claims priority under 35 USC 119 from Japanese Patent Application No. 2008-237524 filed Sep. 17, 2008.

BACKGROUND

1. Technical Field

The present invention relates to an image processing apparatus, an image forming apparatus and a computer readable medium.

2. Related Art

There is provided an image processing apparatus which determines whether or not an image is a copied (an offset) image of a specific image such as a stamp or the like existing in a front face and outputs the results of the determination, and controls an output of the image.

SUMMARY

In consideration of the above circumstances, the present invention provides an image processing apparatus, an image forming apparatus and a computer readable medium.

According to an aspect of the invention, there is provided an image processing apparatus comprising: a read image acquisition section that acquires read image data which is obtained by reading a front face and a rear face of a document; and a specific image region extraction section that extracts, as a specific image region, from among local regions which exist at corresponding positions of the front face and the rear face of the read image data, a local region in which an amount of difference of at least one of hue degree, brightness degree or saturation degree between the front face and the rear face is within a predetermined range.

BRIEF DESCRIPTION OF THE DRAWINGS

Exemplary embodiments of the present invention will be described in detail based on the following figures, wherein:

FIGS. 3A to 3C are flow charts showing concrete examples of specific image region extraction processing executed by the CPU;

FIG. 4A shows an example of a read image, FIG. 4B shows an example of results of the specific image region extraction, and FIGS. 4C to 4F are explanatory views describing an example of correction processing of the specific image region;

FIG. 11 is a view showing a step added in a case where the specific image region is extracted after correcting a foreground color by the background color;

DETAILED DESCRIPTION

Exemplary embodiments in accordance with the present invention will be explained in detail with reference to the accompanying drawings.

[First Exemplary Embodiment]

Figure 1:
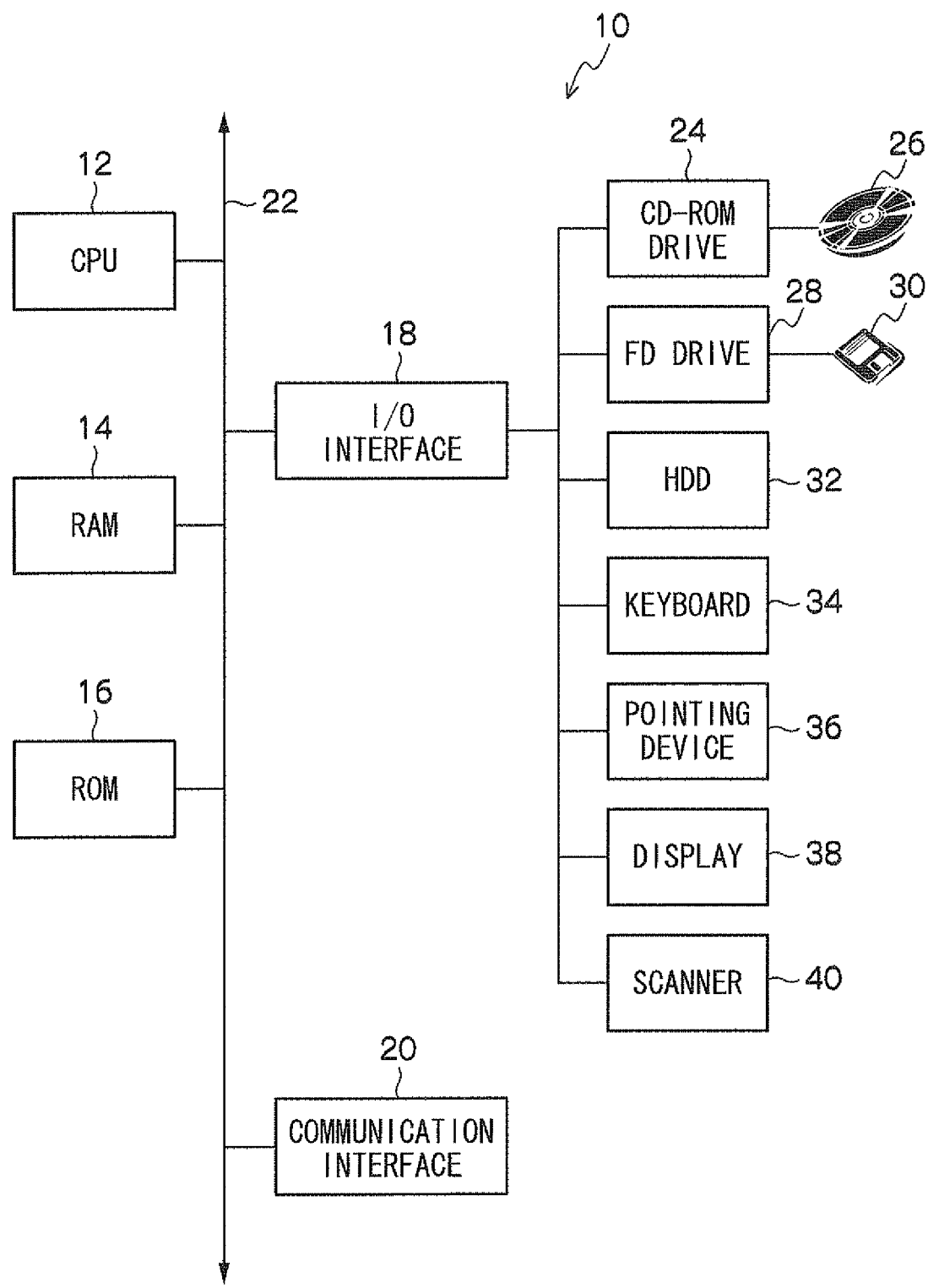
FIG. 1 is a block diagram showing an outline structure of an image processing apparatus in accordance with first to fourth exemplary embodiments.

FIG. 1 is a block diagram showing an outline structure of an image processing apparatus 10 in accordance with a first exemplary embodiment of the invention. The image processing apparatus 10 is provided with a central processing unit (CPU) 12, a random access memory (RAM) 14, a read only memory (ROM) 16, an input and output (I/O) interface 18, and a communications interface 20, and they are connected to each other via a bus 22.

A CD-ROM drive 24, a flexible disc (FD) drive 28 and a hard disc drive (HDD) 32 are connected to the I/O interface 18. The CD-ROM drive 24 reads data from a CD-ROM 26 which is a portable recording medium. The FD drive 28 reads and writes data with respect to an FD 30 which is a portable recording medium. Further, the HDD 32 reads and writes data with respect to an internal hard disc.

Further, the I/O interface 18 is connected with a key board 34 for inputting various information by an operation of a user, and a pointing device 36 which inputs an instruction by the user who appoints an optional position on an image displayed on a display 38 which displays information such as an image or the like by an instruction from the CPU 12. The structure is made such that the key board 34 and the pointing device 36 are provided as input devices. However, if the display 38 is a touch panel display, the display 38 may be used as the input device. The input device is not limited to the key board 34 and the pointing device 36.

Further, a scanner 40 which reads an image of a document is connected to the I/O interface 18. A CPU 60 instructs an operation for reading the image of the document to the scanner 40 via the I/O interface 18, and acquires image data read by the scanner 40 to store in the RAM 14.

Further, the communication interface 20 is connected to a network such as a communication circuit, a LAN or the like. The image processing apparatus 10 exchanges information each other with other terminal connected to the network via the communication interface 20.

The CPU 12 executes a program (including specific image determination processing program mentioned later) stored in the ROM 16, the HDD 32 or the like. The RAM 14 is utilized as a frame memory for temporarily storing various image data such as image data which is input from other terminal via the communication interface 20, image data which is input from the scanner 40 or the like, image data which is newly generated and the like. Further, the RAM 14 is utilized as a work memory when executing a program.

The recording medium in which the program executed by the CPU 12 is stored is not limited to the ROM 16, the HDD 32 and the like, however, it may be constituted by the CD-ROM drive 24 or the FD drive 28. The recording medium may be constituted, for example, by a portable recording medium such as a DVD disc, a magneto-optical disc, or an IC card and the like, a memory device such as an HDD provided external to the image processing apparatus 10 and the like, although an illustration is omitted. Further, the recording medium may be constituted by a data base connected via the network, or the other computer system and a data base thereof, or a transmission medium such as a carrier wave on an electric communication line.

The image processing apparatus 10 in accordance with the present exemplary embodiment carries out specific image determination processing including processing of extracting a specific image region from an image acquired by reading the document.

When an image is recorded on one surface of the document, for example, by a seal, a stamp, a pen or the like, a copy (an offset) of the image recorded on one surface is generated in the other surface. In the present exemplary embodiment, an image (hereinafter, refer to as "a specific original image") which is recorded on one surface and which generates an offset on the other surface, and the offset image are collectively called as "a specific image". Accordingly, an image which is not an offset, for example, a printed image which is printed on the document is not included in the specific image. In the processing of extracting the specific image region, the specific image region is extracted from both front and rear faces. Details of the extraction processing will be described later.

In the present exemplary embodiment, the specific original image means an image which is recorded on one surface and generates an offset on the other surface, regardless of a front face and a rear face of a document. The specific original image may be an image recorded on the front face of the document, or may be the image recorded on the rear face. Further, the offset image means an image of which the specific original image recorded on one surface is copied on the other surface regardless of the front face and the rear face of the document. The offset image may be an offset image on the front face of the document, or may be an offset image on the rear face.

Further, a document from which the specific image region is extracted is a document in which other image (for example, a print image) than the specific image exists. The document may be a document in which the specific original image exists on one surface, and the offset image exists on the other surface. Further, the document may be a document in which other image than the specific image and the specific original image exist on one surface, and the offset image exists on the other surface. The document may be a document in which the specific original image exists on one surface, and the other image than the specific image and the offset image exist on the other surface. Further, the document may be a document in which other image than the specific image does not exist on both the front and rear faces, the specific original image exists on one surface, and the offset image exists on the other surface.

A description will be given below of specific image determination processing carried out in the image processing apparatus 10 in accordance with the present exemplary embodiment.

Figure 2:
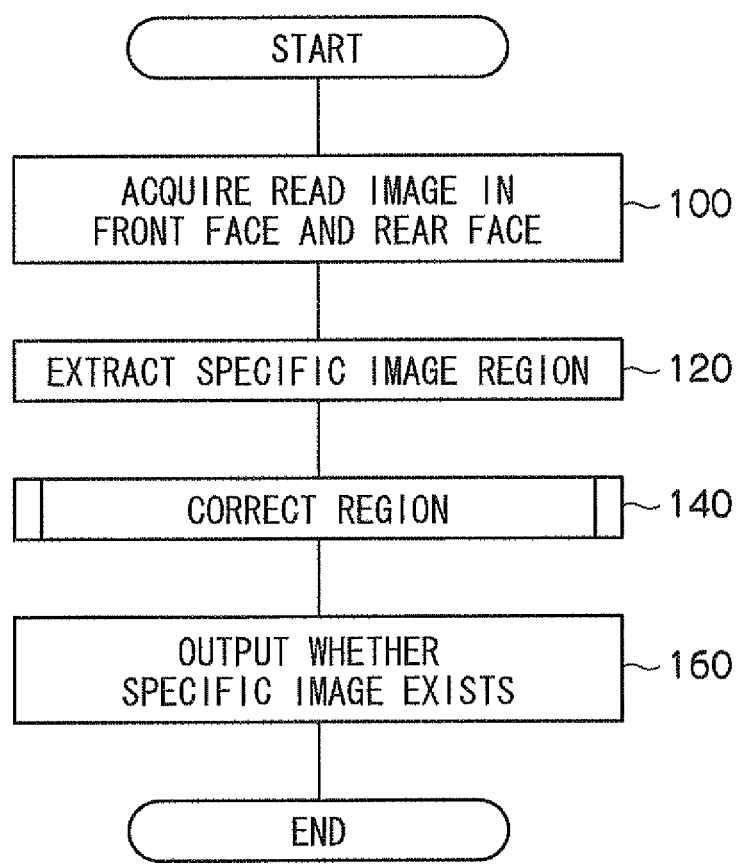
FIG. 2 is a flow chart showing an example of a flow of a main routine of a specific image determination processing program executed by a CPU.

FIG. 2 is a flow chart showing an example of a flow of a main routine of specific image determination processing program executed by the CPU 12.

In step 100, the CPU 12 acquires image data (hereinafter, refer to as the read images) of images obtained by reading both the front and rear faces of the document corresponding to the processed subject. The image data of the read images may be image data obtained by reading the front and rear sides of the document by the scanner 40 equipped in the image processing apparatus 10, or may be image data which is input from an external terminal via the communication interface 20, or may be image data stored in the memory medium such as the CD-ROM 26, the FD 30 or the like. The CPU 12 stores the acquired image data in the RAM 14 or the HDD 32. In this case, the image data of the acquired read image is called as "read image data".

FIG. 4A shows an example of the read image. As shown in the drawings, character information is printed on each of the front face and the rear face, and a seal (the image surrounded by O. Note that the character within O is a Japanese Kanji character meaning a stamp, or a seal impression.) is formed on the front face, and the rear face has a print (the offset image) of the seal (the specific original image) on the front face.

In step 120, the CPU 12 carries out specific image region extraction processing on the basis of the read image data of each of the front face and the rear face. More specifically, the CPU 12 divides the read image of each of the front face and the rear face into plural local regions. The CPU 12 compares the images in the local regions existing at relative positions of the front face and the rear face. The CPU 12 extracts a local region in which amounts of differences of hue degree, brightness degree and saturation degree between the front face and the rear face are within predetermined ranges as the specific image region. The local region means a predetermined small region. The local region may be, for example, a rectangular region in which a number of vertical and horizontal pixels are equal to or less than a predetermined pixel number, or may be a region in which an area is equal to or less than a predetermined pixel number, or may be a region of one pixel.

In a case where the local region is not one pixel, but has plural pixels, the CPU 12 obtains central values (an average value, a medium value, a mode or the like) of hue degree, brightness degree and saturation degree, and determines on the basis of amounts of differences of the central values between the front and rear sides. In this case, an amount of difference may be a difference or a ratio.

Further, in the exemplary embodiment, since a color (a ground color) of the original paper which the document has been printed is set to white, the white is excluded from the specific image region.

The CPU 12 carries out the processing per each of the local regions with respect to a whole of the read images on the front face and the rear face. The CPU 12 stores the image data of the images on both the front and rear faces which distinctively express specific image regions and the other regions, i.e., non-specific image region as the region image data in the RAM 14.

For example, the structure may be made such as to store image data of an image obtained by replacing a pixel of a specific image region in the read image with a specific color, and replacing a pixel in a non-specific image region with a pixel which has a different color from the specific color, as the region image data in the RAM 14. The following description will be given by exemplifying a case where an image data in which a pixel in a specific image region is replaced with a black pixel and a pixel in a non-specific image region is replaced with a white pixel is set as the region image data.

FIG. 4B shows an example of results of extracting the specific image. A portion shown by a black color corresponds to the specific image region. In this case, if an image in which amounts of differences of hue degree, brightness degree and saturation degree between a front face and a rear face are within predetermined ranges is printed at the relative positions on the front face and the rear face (refer also to FIG. 4A), the printed portion is extracted as a specific image region in addition to the specific image such as a seal portion or the like in the specific image extraction processing. In FIG. 4B, the small specific image regions which are dots around the seal portion correspond to specific image regions extracted from the print information portion.

Next, in step 140, the CPU 12 carries out image region correction processing. The image region correction processing means processing of correcting the extracted specific image region mentioned above.

FIG. 3A is a flow chart showing a concrete example of the image region correction processing executed by the CPU 12.

In step 200, the CPU 12 applies smoothing processing to the specific image regions shown by the region image data in each of the front face and the rear face stored in the RAM 14. Accordingly, concentration changes of the images become smooth as shown in FIG. 4C, and the specific image regions come to fuzzy images. Further, a specific image region which has particularly a small area in the specific image region comes to a pale and in a fuzzy state as a whole.

In step 202, the CPU 12 applies binarization processing using a threshold value to the image data in each of the front face and the rear face to which the smoothing processing has been applied. FIG. 4D shows results of binarization processing.

As shown in FIG. 4D, a specific image region which has been a small area before the smoothing processing is removed, and a specific image region which has a large area is left. An area of the removed specific image region and an area of the left specific image region are defined on the basis of a smoothing parameter which determines a degree of smoothing, and a magnitude of the threshold value used in the binarization. The smoothing parameter and the threshold value may be set in advance. Further, the smoothing parameter and the threshold value may be determined in accordance with a type of print information or a specific image printed on a document, a feature of a read image obtained by reading a document, or the like.

In the following description, a portion which has a high concentration and which is expressed by one of the binary is called as a black portion, and a portion which has a low concentration and which is expressed by the other of the binary is called as a white portion. However, the invention does not limit the binary to the black and white.

In step 204, the CPU 12 carries out an expansion and contraction processing for expanding and contracting a portion which has one value of the binary, with respect to the image data in each of the front face and the rear face after the binarization processing. The present exemplary embodiment uses an image data in which a pixel in a specific image region is replaced with a black pixel, and a pixel in a non-specific image region with a white pixel, as the region image data. Accordingly, it is previously set such as to expand and contract a black portion which has a high concentration.

Specifically, the CPU 12 first carries out expansion processing for expanding black portions of the image indicated by the image data to which the binarization processing has been applied by a predetermined pixel number. Next, the CPU 12 applies contraction processing for contracting the black portions by the expanded pixel number to the image data after the expansion processing. One example of results of the expansion and contraction processing is shown in FIG. 4E. In a case where black portions which are spaced with a gap are coupled to each other by the expansion processing, the coupling portion does not disappear even after the contraction processing. In the example shown in FIG. 4E, the black portions which has been spaced each other are coupled by the expansion processing, and a gap (a fine white portion) between black portions which has existed before the expansion and contraction processing is filled. In this case, a pixel number expanded by the expansion processing is set equal to a pixel number contracted by the contraction processing, however, the invention is not limited to this, however, they may be somewhat different as far as they are approximately the same.

In step 206, the CPU 12 stores information indicating specific image regions in each of the front face and the rear face after the correction in the RAM 14 in which black portions indicated by the image data in each of the front face and the rear face after the expansion and contraction processing is set as the specific image regions after the correction.

FIG. 4F illustrates superposed images of the specific image regions before the correction and the specific image regions after the correction. The black portions show the specific image regions before the correction, and portions shown by dots which are inner portions of broken lines indicate the specific image regions after the correction.

The image region correction processing shown in FIGS. 3B and 3C may be carried out in place of the image region correction processing shown in FIG. 3A.

A description will be given of the image region correction processing shown in FIG. 3B.

In step 220, the CPU 12 applies reduction processing which reduces the specific image regions with respect to the region image data in each of the front face and the rear face stored in the RAM 14. The reduction processing having the smoothing effect is applied. The reduction processing having the smoothing effect is reduction processing of, for example, a projective method, a 4-point interpolation method, a 16-point interpolation method and the like. By the reduction processing, fine and small portions in both of the specific image region and the non-specific image region disappear.

In step 222, the CPU 12 applies binarization processing using a threshold value, with respect to the image data in each of the front face and the rear face to which the reduction processing mentioned above has been applied. In this case, as results of binarization processing, a portion which has a high concentration and which is expressed by any one of the binary is called as a black portion, and a portion which has a low concentration and which is expressed by the other of the binary is called as a white portion. However, in the invention, the binary is not limited to the black and white.

In step 224, the CPU 12 applies enlargement processing which enlarges a black portion in such a manner that the black portion is returned to a original magnitude, with respect to the image data in each of the front face and the rear face to which binarization processing has been carried out.

In step 226, the CPU 12 stores information which indicates the specific image region in each of the front face and the rear face after the correction in the RAM 14 in which a black portion after the enlargement processing is set to the specific image region after the correction.

Next, a description will be given of the image region correction processing shown in FIG. 3C.

In step 240, the CPU 12 divides the image indicated by the image data in each of the regions of the front face and the rear face stored in the RAM 14 into regions per coupling component. The coupling component means a portion in which pixels in the specific image region are connected. In the case of the specific image region shown in FIG. 4B, the image is divided into totally eight coupling portions, i.e., a portion O, a left portion of a Japanese Kanji character in the portion O, a right portion the Japanese Kanji character in the portion O, and five small noise portions arranged around the portion O.

In step 242, the CPU 12 extracts a coupling component from plural coupling components, in which at least one of a coupling pixel number (a number of pixels constructing the coupling component), a dimension (a vertical dimension, a lateral direction, or vertical and lateral dimensions), or an area of a circumscribed rectangle is equal to or more than a predetermined threshold value.

In step 244, the CPU 12 replaces a pixel in other than the extracted coupling component with a pixel indicating the non-specific image region, applies expansion processing for expanding the extracted coupling component with respect to the image data in which the pixel has been replaced, and applies contraction processing for contracting the extracted coupling component.

In step 246, the CPU 12 stores information which indicates the specific image regions in each of the front face and the rear face after the correction in the RAM 14 in which a portion remains as the specific image region as results of the processing mentioned above as the specific image region after the correction.

After the image region correction processing is finished, the CPU 12 outputs whether the specific image exists or not in the specific image region on the basis of the results of the extraction of the specific image region, in step 160. Specifically, if the specific image region has a dimension (a vertical dimension, a lateral dimension, or vertical and lateral dimensions) which is equal to or more than a predetermined threshold value, an area which is equal to or more than a predetermined threshold value, or a pixel number which is equal to or more than a predetermined threshold value, the CPU 12 outputs information notifying that the specific image such as a seal or the like exists in the subject document. If the dimension, the area or the pixel number of the specific image region is less than the predetermined threshold value, the CPU 12 outputs information notifying that the specific image does not exist. The output method is not limited to the above methods. For example, the information may be displayed on the display 38, or may be transmitted to other processing apparatus via a communication interface, or may be printed by a printer (not shown). In a case where the information is not used immediately, the information may be output to the memory device such as the HDD 32 or the like so as to be stored.

The structure may be made such as to further output information indicating the extracted specific image region in addition to outputting the information which indicates the specific image exists.

Further, in the exemplary embodiment mentioned above, the description is given by exemplifying the case of determining whether the specific image exists or not and outputting the results of determination. However, the results of the extraction of the specific image region may be output as it is.

Further, in the exemplary embodiment mentioned above, the description is given by exemplifying the correction processing for correcting the specific image region extracted in step 120 in step 140. However, the correction processing in step 140 may be omitted.

[Second Exemplary Embodiment]

In the exemplary embodiment, a description will be given of an image processing apparatus which determines and informs in which of the front face or the rear face the specific original image in the specific images exists when it is determined that the specific image exists, in addition to informing whether the specific image exists or not.

Since the image processing apparatus in accordance with the exemplary embodiment has the same structure as the image processing apparatus 10 in accordance with the first exemplary embodiment, a description thereof will be omitted.

Figure 5:
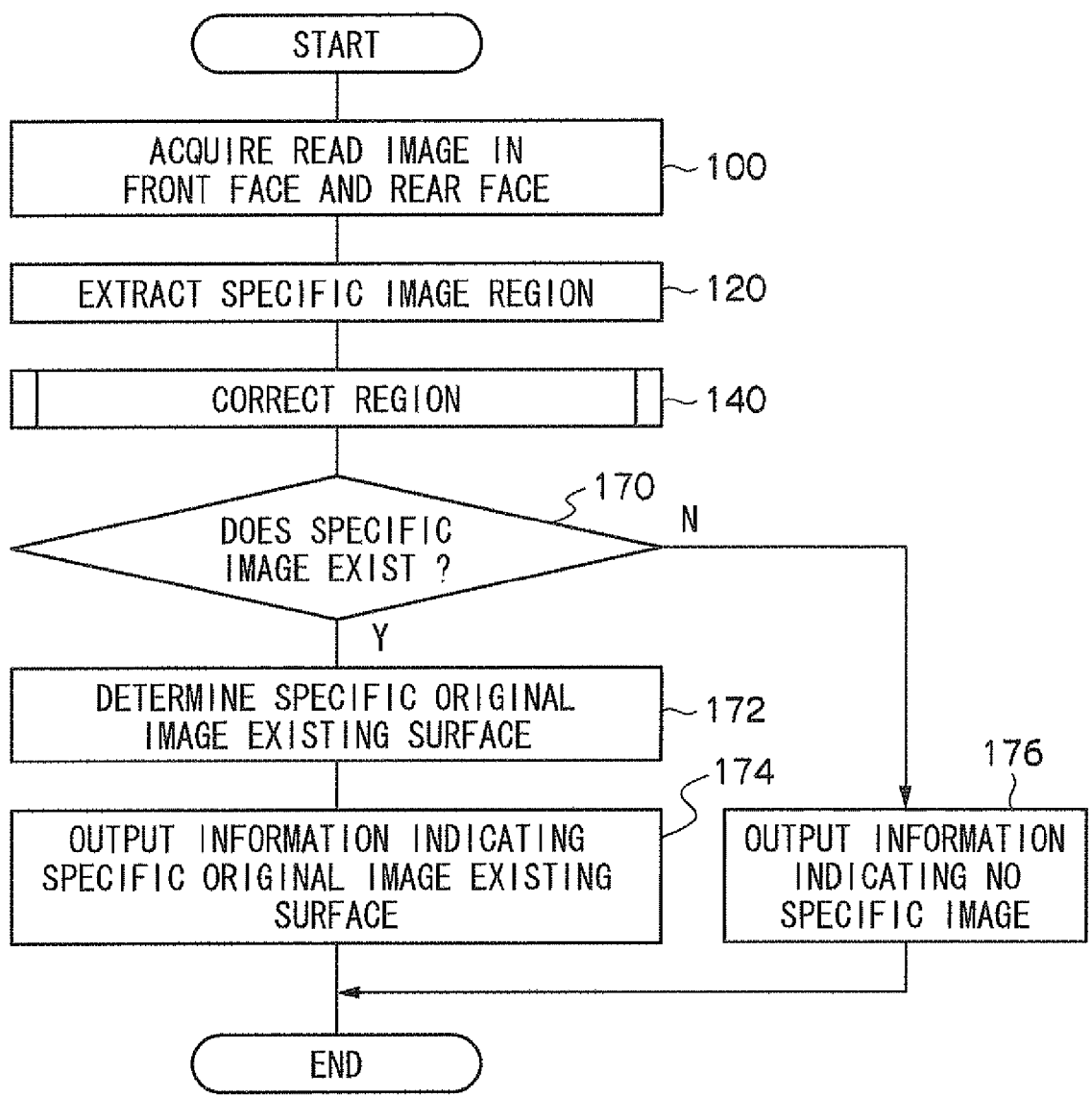
FIG. 5 is a flow chart showing an example of a flow of a main routine of specific image determination processing program in accordance with a second exemplary embodiment.

FIG. 5 is a flow chart showing an example of a flow of a main routine of specific image determination processing program in accordance with the exemplary embodiment. Steps having the same reference numerals as those of FIG. 2 are steps carrying out similar processes as those of FIG. 2 and a description thereof will be omitted.

After the processing from step 100 to step 140, the CPU 12 determines whether the specific image exists or not on the basis of the results of extraction of the specific image region, in step 170. The determination method is carried out in a similar manner as step 160 in accordance with the first exemplary embodiment. The CPU 12 proceeds to step 172 if the CPU 12 determines that the specific image such as a seal or the like exists in the subject document (Y in step 170).

In step 172, the CPU 12, with respect to the specific image region determined in step 140, compares local regions which exist at the relative positions on the front face and the rear face, and determines a specific original image existing surface in which the specific original image exists.

For example, the structure may be made such as to compare brightness degree in the local regions which exists at the relative positions on the front face and the rear face, and determine a surface in which more number of local regions which have relatively higher brightness degree exist as the specific original image existing surface.

Further, the structure may be made such as to compare saturation degree with respect to the local regions which exists at the relative positions on the front face and the rear face, and determine that a surface in which more number of local regions which have relatively higher saturation degree exist as the specific original image existing surface.

Further, the structure may be made such as to compare both of brightness degree and saturation degree with respect to the local regions which exist at the relative positions on the front face and the rear face, and determine that a surface in which more number of local regions which have relatively high brightness degree and saturation degree exist as the specific original image existing surface.

Further, the structure may be made such as to determine central values (average values, medium values or etc.) of at least one of the brightness degree or saturation degree of pixels per the front face and the rear face, compare the central values and determine a surface having a higher value as the specific original image existing surface.

Further, the structure may be made such as to binarize each of the image data in the specific image regions of the front face and the rear face by a floating binarization method, divide the image data in a manner that a portion having a high concentration is as a foreground region and a portion having a low concentration is set as a background region, and determine that a surface which has a larger area in the foreground region (or a surface which has a smaller area in the background region) is set as the specific original image existing surface. Further, for example, when a ground color of the document is known or a ground color is detected, a region having a color within a predetermined range including the ground color may be set as the background region and other region may be set as the foreground region and compare areas of the background region and the foreground region.

The specific original image existing surface may be determined by comparing at least one of the brightness degree, the saturation degree or the area of the foreground region. It may be determined by comparing all of them or may be determined by comparing two of them. The determination method is not limited to the above.

In step 174, the CPU 12 outputs information indicating the specific original image existing surface determined in step 172. An outputting method is not limited. For example, the information may be displayed on the display 38, or may be transmitted to other processing apparatus via a communication interface, or may be printed by a printer (not shown) or the like. In a case where the information is not used immediately, the information may be output to a memory device such as the HDD 32 or the like to store.

Information indicating the extracted specific image region may be output together with the specific original image existing surface.

On the other hand, if in step 170 it is determined that the specific image does not exist (N in step 170), it goes to step 176.

In step 176, the CPU 12 outputs information indicating that there is not any specific image. The outputting method is not limited in a similar manner as step 174. For example, the information may be displayed on the display 38, or may be transmitted to other processing apparatus via a communication interface, or may be printed by a printer (not shown) or the like. In a case where the information is not immediately used, the information may be output to a memory device such as the HDD 32 or the like to store.

In this case, in the exemplary embodiment, the correction processing (step 140) for correcting the specific image region extracted by step 120 may be omitted.

[Third Exemplary Embodiment]

In the exemplary embodiment, a description will be given of an image processing apparatus determining whether the specific image exists or not, the specific original image existing surface and a type of the specific image.

Since the image processing apparatus in accordance with the exemplary embodiment has the same structure as the image processing apparatus 10 in accordance with the first exemplary embodiment, a description thereof will be omitted. Image data of plural types of predetermined specific images is stored in the HDD 32 or the ROM 16 in accordance with the exemplary embodiment. In the exemplary embodiment, the image data of the specific original image in the specific image is registered. Hereinafter, the registered specific image is called as "a registered specific image". Further, an image data of the registered specific original image is called as "registered image data" in order to distinguish from the image data of the specific original image actually recorded in the document.

Figure 6:
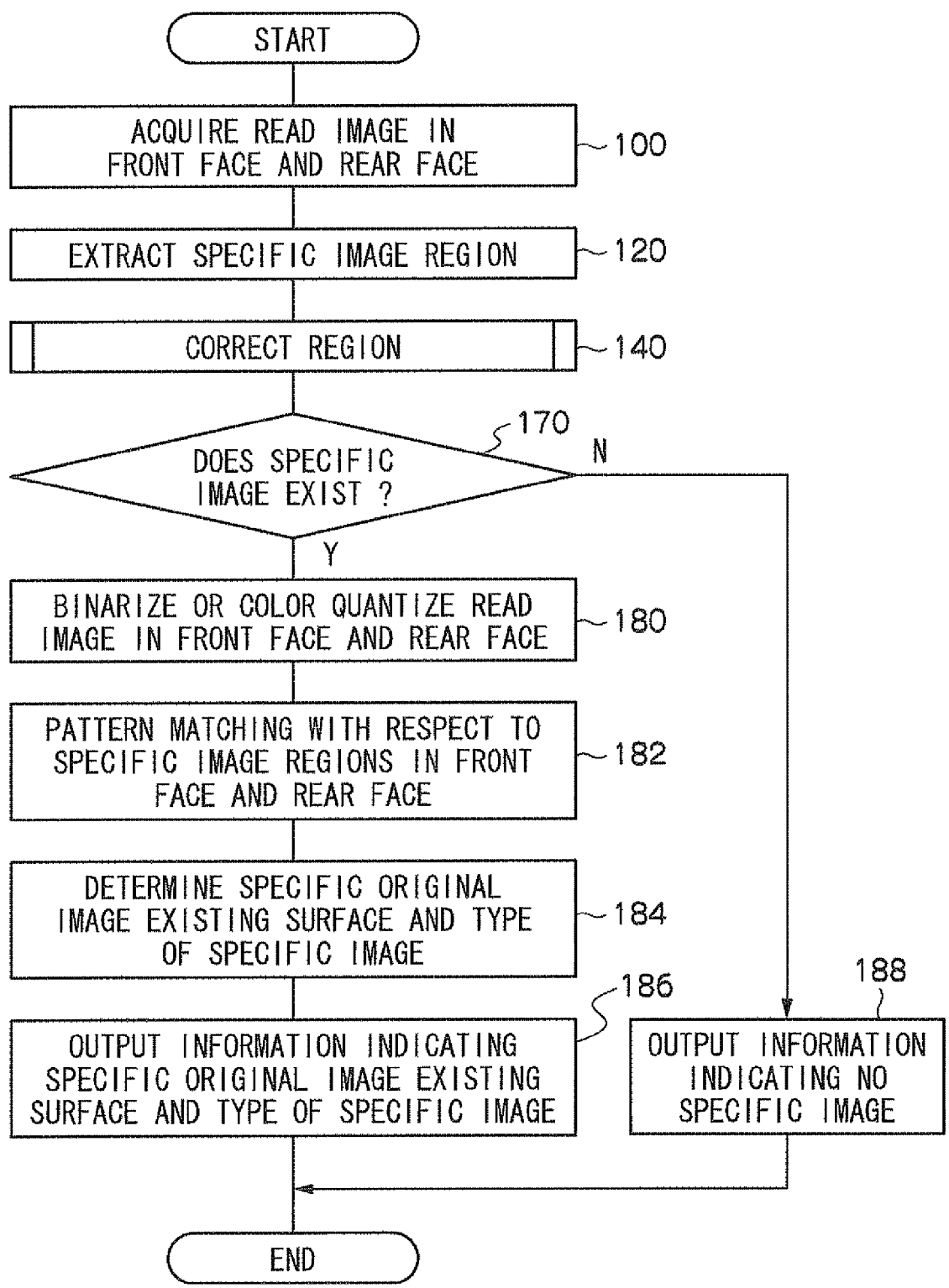
FIG. 6 is a flow chart showing an example of a flow of a main routine of specific image determination processing program in accordance with a third exemplary embodiment.

FIG. 6 is a flow chart showing an example of a flow of a main routine of a specific image determination processing program in accordance with the exemplary embodiment. Steps having the same reference numerals as those of FIG. 2 are steps carried out in similar processing as FIG. 2 and a description thereof will be omitted.

Figure 7:
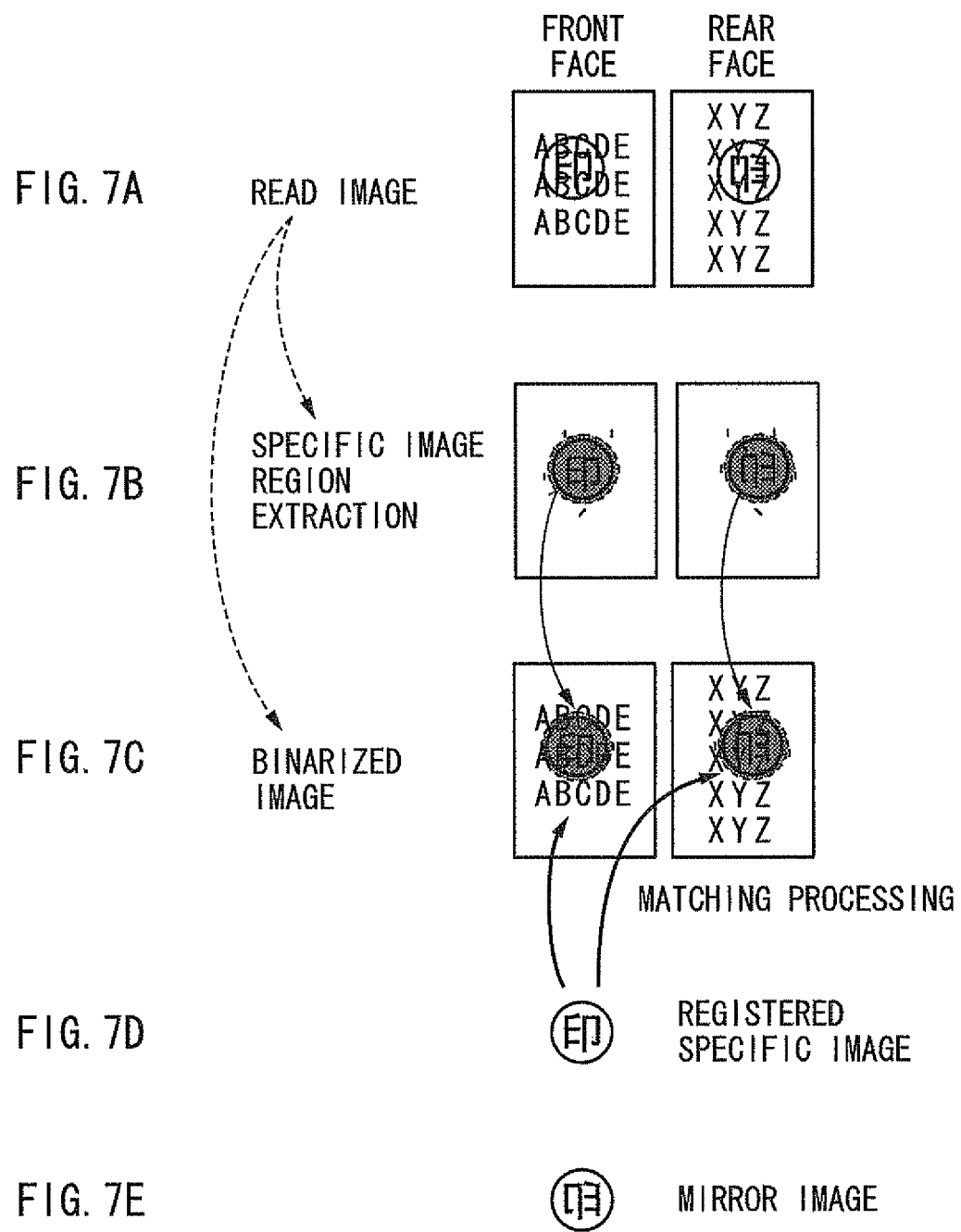
FIGS. 7A to 7E are explanatory views schematically describing contents of the specific image determination processing in accordance with the third exemplary embodiment.

The specific image region is extracted as shown in FIG. 7B from the read image data of both the front and rear faces shown in FIG. 7A, in accordance with the processing from step 100 to step 140.

In step 170, the CPU 12 determines whether the specific image exists or not, on the basis of the results of extraction processing of the specific image region. The determination method is carried out in a similar manner as step 160 in accordance with the first exemplary embodiment. The CPU 12 goes to step 180 if it determines that the specific image such as the seal or the like exists in the subject document (Y in step 170).

In step 180, the CPU 12 binarizes or color quantizes each of the read image data of the front face and the rear face (refer also to FIG. 7C).

The color quantization means which set two or more specific colors as limited colors in advance and convert a color of a pixel to be processed into a limited color which is closest to the color of the pixel to be processed in a predetermined color space. For example, if the specific colors are set to three colors, i.e, white, black and red, the read image is converted into the image which has only white, black and red colors.

In general, the specific image such as a personal seal, a stamp or the like frequently has a chromatic color such as a red color or the like. Accordingly, when the read image data is color quantized, a color of a registered specific image may be set as a limited color in advance.

A description will be given below of the case of binarizing each of the read image date of the front face and the rear face to process.

In step 182, the CPU 12 reads the registered image data, and carries out a pattern matching (collation processing) with the registered image data, for the specific image region determined by step 140 in the read image data in each of the front face and the rear face (refer also to FIGS. 7C and 7D). A similarity is determined per registered specific image by the pattern matching processing. Since the pattern matching processing is a well-known technique, a detailed description thereof will be omitted.

In step 184, the CPU 12 determines the type of the specific image which exists in the document, and the specific original image existing surface on the basis of results of pattern matching.

For example, the CPU 12 determines a type of a registered specific image used as a matching image in the pattern matching processing of which the highest similarity is determined, as the type of the specific image existing in the document. Further, in a case where the highest similarity is a similarity which is determined by the pattern matching processing with the image which exists in the specific image region of the front face, the CPU 12 determined that the specific original image existing surface is a "front face". Further, in a case where the highest similarity is a similarity which is determined by the pattern matching processing with the image which exists in the specific image region of the rear face, the CPU 12 determines that the specific original image existing surface is a "rear face".

In this case, the CPU 12 does not carry out the determination mentioned above, in a case where all of the similarities are equal to or less than a predetermined value. The CPU 12 determines that some specific image exists in the document, however, it is not the predetermined registered specific image. Alternatively, the CPU 12 may determine that the specific image does not exist in the document.

The CPU 12 stores the results of determination mentioned above in the RAM 14.

In step 186, the CPU 12 outputs the results of determination (the specific original image existing surface and the type of the specific image) stored in the RAM 14 in step 184. The outputting method is not limited. For example, the results of determination may be displayed on the display 38, or may be transmitted to other processing apparatus via a communication interface, or may be printed by a printer (not shown) or the like. In a case where the results of determination is not immediately used, the results of determination may be output to a memory device such as the HDD 32 or the like to store.

In this case, the structure may be made such as to output information which indicates the specific image region extracted in the specific image region extraction processing, together with the results of determination mentioned above.

On the other hand, in a case where step 170 determines that the specific image does not exist (N in step 170), it goes to step 188.

In step 188, the CPU 12 outputs information that the specific image does not exist. The outputting method is not limited in a similar manner as step 186. For example, the information may be displayed on the display 38, or may be transmitted to other processing apparatus via a communication interface, or may be printed by a printer (not shown) or the like. In a case where the information is not immediately used, the information may be output to a memory device such as the HDD 32 or the like so as to store.

In the exemplary embodiment, the description is given of the example in which the pattern matching is carried out with respect to the specific image regions in each of the front face and the rear face, after the binarization processing. However, the pattern matching may be carried out without the binarization processing.

Further, in the exemplary embodiment, the description is given of the example in which plural types of specific images are registered. However, the specific images may be one type of images. In a case where the registered specific image is one type, the CPU may determine whether or not the registered specific image exists in the document, rather than determining the type of the specific image.

Further, the binarization processing or the color quantizing processing in step 180 may be carried out at any time as far as it is carried out before the pattern matching processing in step 182. Further, it may be carried out in parallel with the extraction processing and the correction processing of the specific image region.

Further, in the exemplary embodiment, the binarization processing or the color quantizing processing in step 180 is carried out with respect to a whole of the read image, however, may be carried out with respect to only the specific image region.

Further, in the exemplary embodiment, the description is given by exemplifying the case where the pattern matching is carried out with respect to the specific image regions of the read images in both of the front face and the rear face. However, the structure is not limited to this, however, the pattern matching may be carried out with respect to only the front face. A description will be given below of the case where the pattern matching is carried out as mentioned above.

Image data of an offset image (an image date of a mirror image which is obtained by mirror reversing the specific original image) is also registered in addition to the image data of the specific original image, in a memory of the HDD 32, the ROM 16 or the like (refer also to FIG. 7E). The image data of the registered specific original image is called as "registered specific original image data" and the image data of the registered offset image is called as "registered offset image data" in order to distinguish the image data of the specific image which is actually recorded in the document.

Further, the CPU 12 binarizes or color quantizes only the read image data in the front face, in place of the processing of step 180.

Further, the CPU 12 reads the image data of the registered specific image (in this case, the registered specific original image data and the registered offset image data) and carries out a pattern matching with each of the image data of the registered specific images with respect to the specific image region determined in step 140 in the read image data in the front face, in place of the processing of step 182.

In the determination processing of step 184, it determines as follows. In a case where matching processing in which the highest similarity is obtained is matching processing with the registered specific original image data, the CPU 12 determines that the specific original image existing surface is a "front face", and determines that a type of the registered specific image of the registered specific original image data is the type of the specific image existing in the document.

Further, in a case where matching processing in which the highest similarity is obtained is matching processing with the registered offset image data, the CPU 12 determines that the specific original image existing surface is a "rear face", and determines that a type of the registered specific image of the registered offset image data is the type of the specific image existing in the document.

In this case, in a case where all of the similarities are equal to or less than a predetermined value, the CPU 12 determines that some specific image exists in the document, however, it is not the previously registered specific image, without carrying out the determination mentioned above. Alternatively, it may be determined that the specific image does not exist in the document.

The CPU 12 stores the results of determination mentioned above in the RAM 14.

The processing of step 186 is similar as the exemplary embodiment mentioned above.

In this case, the description is given of the example in which the pattern matching is carried out for only the front face. In a case where the pattern matching is carried out with respect to only the rear face, the processing is carried out in a similar manner as mentioned above.

Further, the pattern matching may be carried out for the specific image regions in each of both the front and rear faces, in taking into consideration of a case where a bleeding, a thin spot or the like is generated in the specific original image which is sealed on the specific original image existing surface and therefore the pattern matching would not go well.

[Fourth Exemplary Embodiment]

In the exemplary embodiment, a description will be given of an image processing apparatus which carries out the pattern matching with the registered specific image with respect to the determined specific original image existing surface, after determining the specific original image existing surface.

Since the image processing apparatus in accordance with the exemplary embodiment has the same structure as the image processing apparatus 10 in accordance with the first exemplary embodiment, a description thereof will be omitted.

Further, in the image processing apparatus in accordance with the exemplary embodiment, image data of plural types of specific images (image data of specific original images in the exemplary embodiment) is registered in advance in the HDD 32 or the ROM 16, in a similar manner as the third exemplary embodiment. A type of the registered specific image may be one type, however, plural types may be set in the exemplary embodiment. Further, in order to distinguish from image data of a specific original image actually recorded in a document, the image data of the registered specific original image is called as "registered image data".

Figure 8:
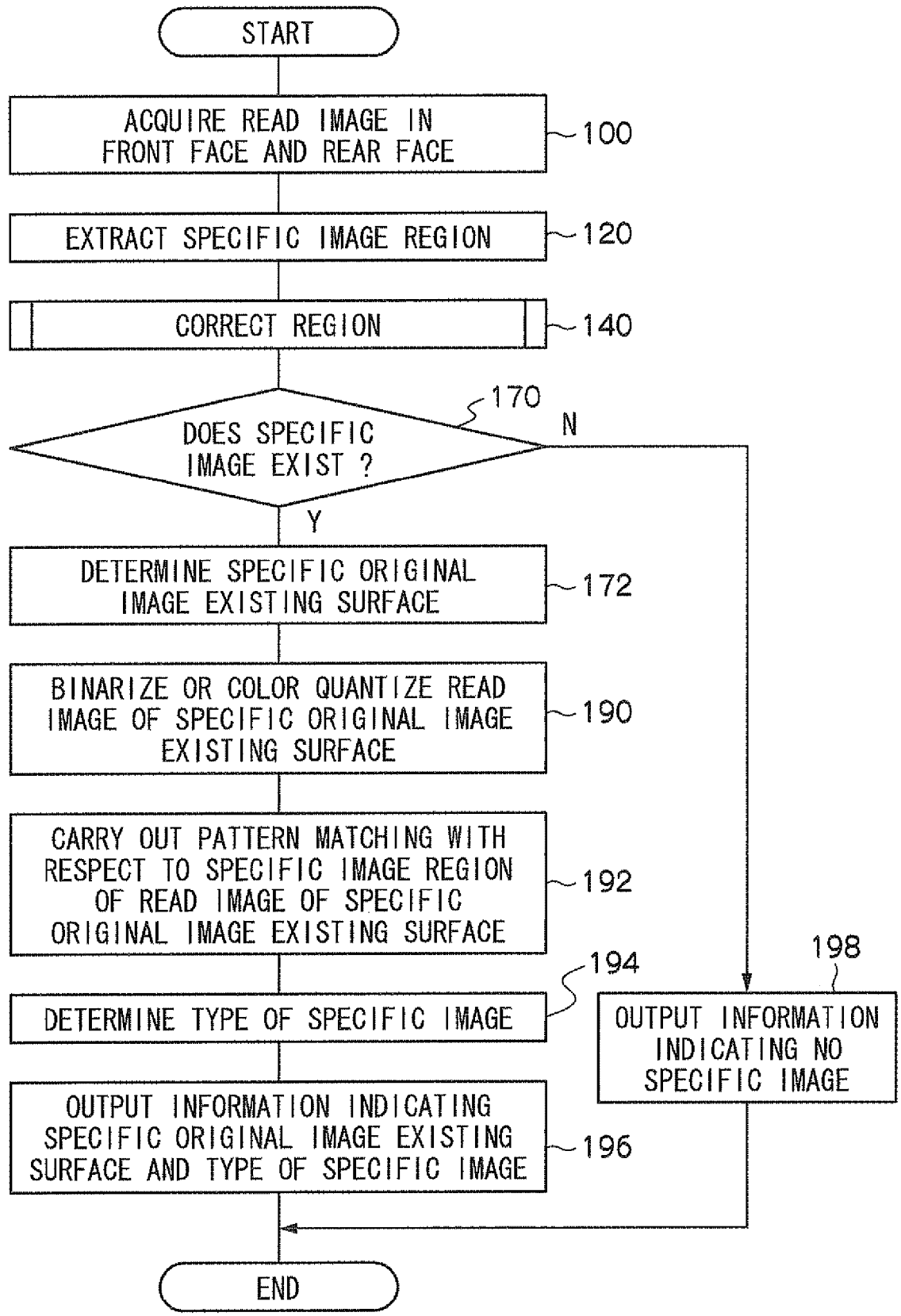
FIG. 8 is a flow chart showing an example of a flow of a main routine of specific image determination processing program in accordance with a fourth exemplary embodiment.

FIG. 8 is a flow chart showing an example of a flow of a main routine of a specific image determination processing program in accordance with the exemplary embodiment. In this case, steps having the same reference numerals as those of FIG. 2 are steps carrying out similar processing as those of FIG. 2 and a description thereof will be omitted.

After the processing from step 100 to step 140, the CPU 12 determines whether the specific image exists or not on the basis of the results of extraction of the specific image region. The determination method is carried out in a similar manner as step 160 in accordance with the first exemplary embodiment. The CPU 12 goes to step 172 in a case where the CPU 12 determines that the specific image such as a seal or the like exists in a subject document (Y in step 170).

In step 172, the CPU 12, with respect to the specific image region determined in step 140, compares the local regions which exist at the relative positions on the front face and the rear face, and determines the specific original image existing surface. Since the determination method is similar as that described in the second exemplary embodiment, a description thereof will be omitted.

Next, in step 190, the CPU 12 binarizes or color quantizes the read image data of the surface determined as the specific original image existing surface in step 172.

In step 192, the CPU 12 reads the registered image data, and carries out the pattern matching with the registered image data with respect to the specific image region determined in step 140 in the read image data of the specific original image existing surface.

In step 194, the CPU 12 determines that a type of the registered specific image which is used as the matching image in the pattern matching processing in which the highest similarity is determined is the type of the specific image existing in the document.

Further, in a case where all of the similarities are equal to or less than the predetermined value, the CPU 12 determines that some specific image exists in the document, however, it is not the previously registered specific image, without carrying out the determination mentioned above. Alternatively, it may be determined that the specific image does not exist in the document.

The CPU 12 stores the results of determination mentioned above in the RAM 14.

In step 196, the CPU 12 reads information which indicates the results of determination of the specific original image existing surface determined in step 140, and information indicating the results of determination of the type of the specific image determined in step 194 from the RAM 14 to output. The outputting method is not limited. For example, the results of determination may be displayed on the display 38, or may be transmitted to other processing apparatus via a communication interface, or may be printed by a printer (not shown) or the like. In a case where the information is not immediately used, the results of determination may be output to a memory device such as the HDD 32 or the like to store.

In this case, the information which indicates the specific image region may be output together with the specific original image existing surface.

On the other hand, in a case where step 170 determines that the specific image does not exist (N in step 170), it goes to step 198.

In step 198, the CPU 12 outputs information which indicates that there is not any specific image. The outputting method is not limited in a similar manner as step 196. For example, the information may be displayed on the display 38, or may be transmitted to other processing apparatus via a communication interface, or may be printed by a printer (not shown) or the like. In a case where the information is not immediately used, the information may be output to a memory device such as the HDD 32 or the like to store.

In this case, as a modified example of the exemplary embodiment, for example, the structure may be made such as to previously register the image data of the offset image in addition to the image data of the specific original image, and carry out the matching processing with the image which exists in the specific image region in the opposite surface to the specific original image existing surface, and the image data of the previously registered offset image, in a case where the similarity determined by the pattern matching processing to the image data of the specific original image with respect to the specific original image existing surface is equal to or less than a predetermined value. In a case where similarities which are over the predetermined value are determined in accordance with the matching processing with the image data of the offset image, a type of a registered specific image corresponding to a matching image of matching processing in which the highest similarity is demanded is determined as the type of the specific image existing in the document.

OTHER MODIFIED EXAMPLES

The invention is not limited to the first to fourth exemplary embodiments described above. For example, in the first to fourth exemplary embodiments mentioned above, the description is given by exemplifying the image processing apparatus which extracts the specific image region by always comparing all of the hue degree, the brightness degree and the saturation degree. However, the invention is not limited to this, however, may be an image processing apparatus which extracts the specific image region by comparing at least one of the hue degree, the brightness degree or the saturation degree in accordance with the feature information of the read image.

Figure 9:
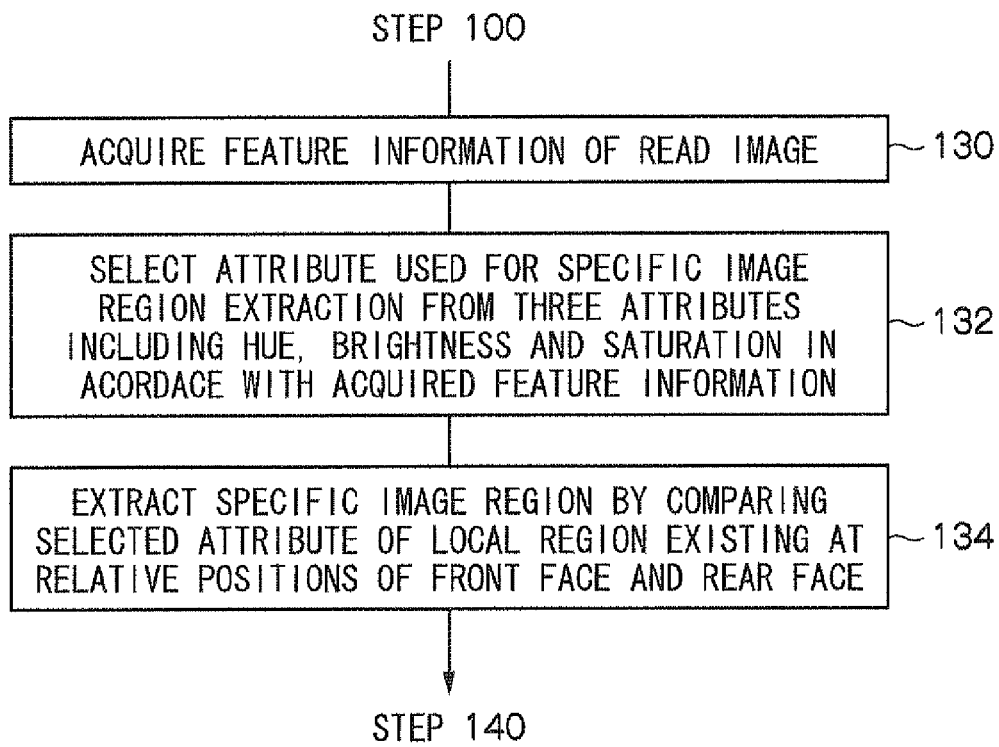
FIG. 9 is a view showing a modified example of the specific image region extraction processing.

Specifically, for example, the program may be designed in such a manner that processing shown in FIG. 9 is carried out, in place of the processing of step 120 shown in the flow chart in FIGS. 2, 5, 6 and 8 described in the first to fourth exemplary embodiments.

The CPU 12 acquires the read image data in step 100 in FIGS. 2, 5, 6 and 8, and thereafter acquires the feature information of the read image indicated by the read image data in step 130 in FIG. 9.

The feature information of the read image may be, for example, a distribution of at least one of brightness degree, saturation degree or hue degree of the read image, or may be a type of the document indicated by the read image (for example, a type indicating the contents of the document, a debit note or the like, or a type indicating a format or the like). Further, the feature information of the read image may be acquired by analyzing the read image data by means of the CPU 12, or may be acquired by analyzing the read image data by means of the other apparatus. Further, in a case where the document to be processed other than the specific image is only a black and white print, a user may previously register the feature information that the document is the black and white print, and the CPU 12 may acquire the feature information.

In step 132, the CPU 12 selects an attribute which is used for extracting the specific image region from three attributes which includes a hue degree, a brightness degree and a saturation degree, in accordance with the feature information of the read image.

In step 134, the CPU 12 carries out the specific image region extraction processing on the basis of an amount of difference of the selected attribute mentioned above of the local regions which exist at the relative positions of the front face and the rear face.

For example, in a case where a number of chromatic colors of the read image determined on the basis of a hue distribution of the read image is one color, the CPU may use only the saturation degree. Further, the specific image region extraction processing may be carried out by determining whether or not an amount of difference of saturation degree between the front face and the rear face in the local regions is within a predetermined range.

Further, for example, in a case where the document is a black and white document, and a color of the specific image is a specific chromatic color, the specific image region extraction processing may be carried out in a similar manner as mentioned above by using only the saturation degree. Further, since the chromatic color generally has a higher brightness degree than the black color, the specific image region extraction processing may be carried out in a similar manner by using only the brightness degree.

Further, for example, in a case where a color of the specific image is known, the specific image region extraction processing may be carried out by using only a hue degree. Further, the specific image region extraction processing may be carried out in a similar manner as the exemplary embodiment mentioned above by combining a brightness degree and a saturation degree with a hue degree i.e., by using three attributes.

Further, for example, in a case where it does not correspond to any case mentioned above, the determination may be made by using only the hue degree, or the specific image region extraction processing may be carried out in a similar manner as the exemplary embodiment mentioned above by using three attributes.

Further, the description is given of the example in which the specific image region extraction processing is carried out by comparing at least one of the hue degree, the brightness degree or the saturation degree in accordance with the feature information of the read image. However, a setting section which makes a user set in advance whether or not the specific image region extraction processing is carried out by using which of a hue degree, a brightness degree or a saturation degree may be provided. In this case, the CPU 12 carries out the specific image region extraction processing in accordance with settings of the setting portion.

After the processing of step 134, it goes to step 140 in FIGS. 2, 5, 6 and 8, and carries out the specific image region extraction processing described in the exemplary embodiment mentioned above.

Figure 10:
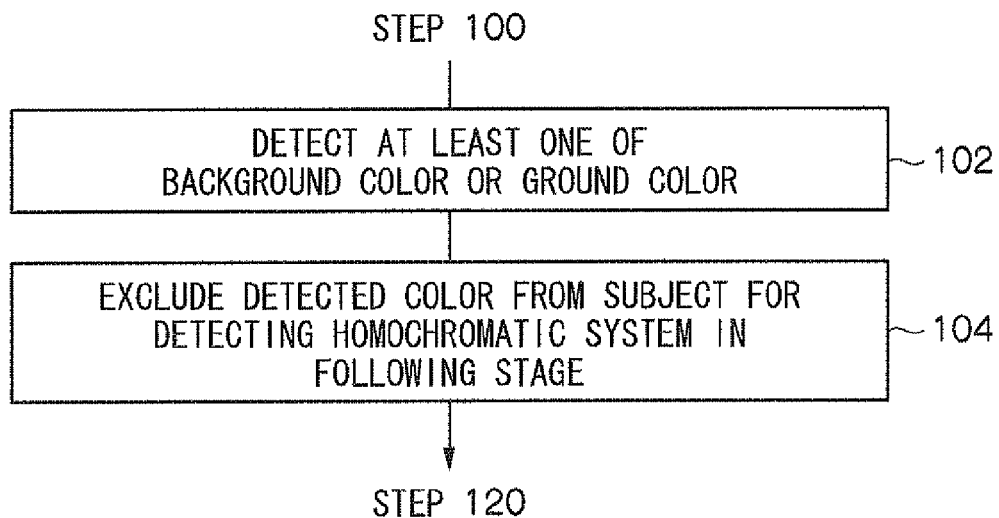
FIG. 10 is a view showing a step added in a case where at least one of a background color or a ground color of a document is excluded from subjects for extracting the specific image region.

Further, as the other modified example, processing shown in FIG. 10 may be inserted between steps 100 and 120 shown by the flow charts in FIGS. 2, 5, 6 and 8 (in other words, before the specific image region extraction processing).

The CPU 12 acquires the read image data in step 100 in FIGS. 2, 5, 6 and 8, and thereafter detects at least one of the background color or the ground color of the document included in the read image data, in step 102 in FIG. 10.

Specifically, in a case where a ground color of the document is known, the structure may be made such as to detect a color in a predetermined range including the known ground color as the background color in a predetermined color space.

Further, the structure may be made such as to detect the ground color by analyzing the color distribution of the document. The detection of the ground color, for example, generates histograms of colors included in the read image, and extracts a high-frequency color as the ground color.

Further, the structure may be made such as to extract a portion which has a high concentration as a foreground region, and a portion having a low concentration as a background region, and detect a color of the background region as the background color, in accordance with a floating binarization (a moving average method).

In step 104, the CPU 12 sets the detected color so as to be excluded from the subject of the specific image region extraction.

Thereafter, in step 120, the CPU 12 extracts the specific image region other than the detected color mentioned above, in accordance with the setting mentioned above.

Further, as the other modified example, the processing shown in FIG. 11 may be inserted between steps 100 and 120 shown in the flow charts in FIGS. 2, 5, 6 and 8 (in other words, before the specific image region extraction).

The CPU 12 acquires the read image data in step 100 in FIGS. 2, 5, 6 and 8 (refer also to FIG. 12A), and thereafter detects the background color of the background region included in the read image data in step 110 in FIG. 11. The CPU extracts the portion which has the high concentration as the foreground region, and detects the color of the background region around the foreground region as the background color, in accordance with the floating binarization (the moving average method).

Specifically, the CPU 12 determines the background color from a peripheral background region which is adjacent to the foreground region mentioned above. For example, the structure may be made such as to detect a color in a region within a predetermined range (for example, a region of a small window shown in FIG. 12C, hereinafter, this region is called as "a neighbor region") around pixels in the foreground region extracted by the floating binarization. Further, the structure may be made such as to detect the background color of the neighbor region per coupling component into which plural pixels constructing the foreground region are coupled.

Figure 12A:
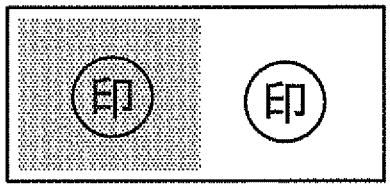
FIGS. 12A to 12C are explanatory views describing processing of extracting the background color.
Figure 12B:
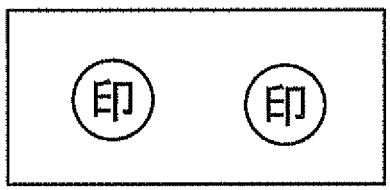
Figure 12C:
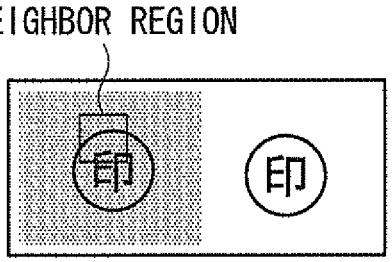

In step 112, the CPU 12 carries out a color correction of the foreground color on the basis of the background color. Specifically, a difference of the determined background color mentioned above from the white color is added to the color of the foreground region. As shown in FIG. 12A, in a case where background colors are different in accordance with positions, correction amounts of the color correction are different in accordance with the positions.

Thereafter, in step 120, the CPU 12 carries out a homochromatic system determination with respect to the corrected read image data mentioned above.

Both the processing in FIGS. 10 and 11 mentioned above may be carried out before the specific image region extraction. In this case, any processing of the processing in FIG. 10 and the processing of FIG. 11 may be carried out in advance, and a processing order is not limited.

Further, in the first to fourth exemplary embodiments and the modified examples mentioned above, the description is given of the example in which the functions of the image processing apparatus is achieved by a software, however, the functions may be achieved by a hardware.

Figure 13:
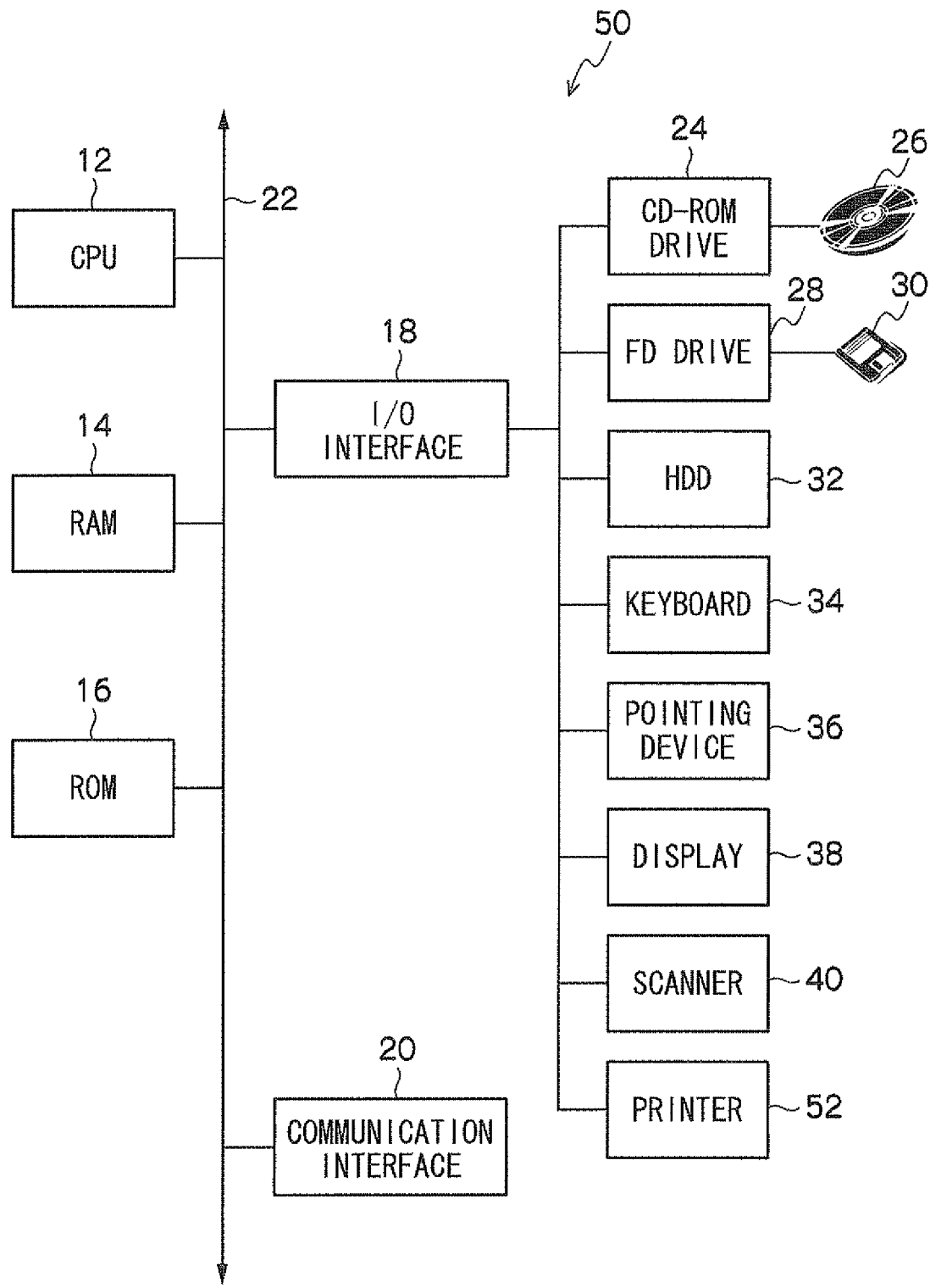
FIG. 13 is a block diagram showing an outline structure of an image forming apparatus in accordance with a modified exemplary embodiment.

Further, the invention may be applied to an image forming apparatus provided with a printing function. FIG. 13 is a block diagram showing an example of an outline structure of the image forming apparatus. An image forming apparatus 50 is an apparatus provided with a printer 52 which carries out a printing in the image processing apparatus 10 shown in FIG. 1. The printer 52 is connected to an I/O interface 18, and carries out printing in accordance with a control signal from the CPU 12. Since the other structures than the printer 52 are similar as those of FIG. 1, a further description will be omitted.

Figure 14:
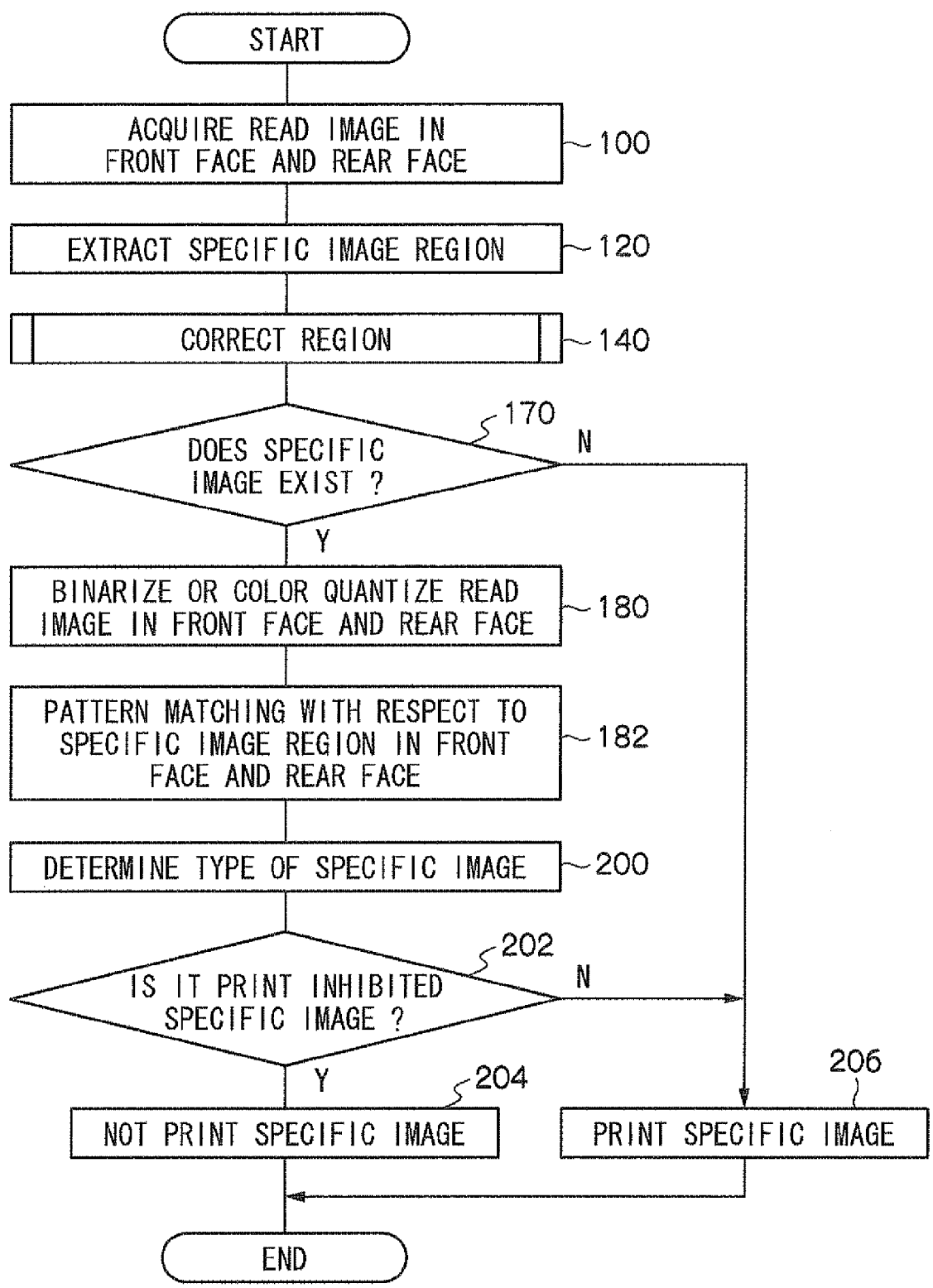
FIG. 14 is a flow chart showing an example of a flow of printing control processing program executed by a CPU of an image forming apparatus in accordance with the modified exemplary embodiment.

An example of an operation of the image forming apparatus 10 is shown in a flow chart in FIG. 14.

In steps of the flow chart shown in FIG. 14, since the processing from step 100 to step 182 are similar as the processing from step 100 to step 182 of the flow chart in FIG. 6 which are described in the third exemplary embodiment, a description thereof will be omitted.

In step 200, the CPU 12 determines the type of the specific image existing in the document, on the basis of the results of pattern matching. For example, the CPU 12 determines a type of a registered specific image used as a matching image in the pattern matching processing in which the highest similarity is demanded, as the type of the specific image existing in the document.

In this case, in a case where all of the similarities are equal to or less than the predetermined value, the CPU 12 determines that some specific image exists in the document, however, it is not the registered specific image, without carrying out the determination mentioned above. Alternatively, the CPU may determine that the specific image does not exist in the document.

In step 202, the CPU 12 determines whether or not the type of the determined specific image is a specific image indicating "print inhibition". The type of the specific image which indicates the print inhibition is set in advance by being stored in the HDD 32 or the like.

In a case where the CPU 12 determines in step 202 that the type of the determined specific image is not the specific image indicating the print inhibition, and in a case where the CPU 12 determines in step 170 that the specific image does not exist, step 206 outputs the control signal and the read image data to the printer 52 in such a manner that the image is formed (printed) on the basis of the read image data. The printer 52 carries out the printing processing on the basis of the read image data in accordance with the control signal.

On the other hand, in a case where the CPU 12 determines in step 202 that the type of the determined specific image is the specific image indicating the print inhibition, the CPU 12 corrects the read image data in such a manner that the specific image existing in the document is not printed, and outputs the control signal and the corrected read image data to the printer 52 in such a manner as to print on the basis of the corrected read image data. The printer 52 carries out the printing processing on the basis of the corrected read image data in accordance with the control signal.

In addition to the control mentioned above, for example, the image forming apparatus 50 may be structured such as to determine the type of the specific image as described in the fourth exemplary embodiment and carry out the print control. Further, the structure may be made such as to control in such a manner that a whole of the read image is not printed in addition to the specific image, in a case where it is determined that the specific image indicates as the print inhibition, or otherwise to carry out printing on the basis of the read image data.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to are suited to the particular use contemplated. It is intended that the scope of the invention be defined by the following claims and their equivalents.

What is claimed is:

1. An image processing apparatus comprising:
    a read image acquisition section that acquires read image data which is obtained by reading a front face and a rear face of a document;
    a specific image region extraction section that extracts, as a specific image region, from among local regions which exist at corresponding positions of the front face and the rear face of the read image data, a local region in which an amount of difference of at least one of hue degree, brightness degree or saturation degree between the front face and the rear face is within a predetermined range; and
    an image region correction section that corrects the specific image region by carrying out image processing in which a region having an area which is equal to or less than a predetermined area is excluded and a region having an area which is more than the predetermined area is retained, with respect to the specific image region extracted by the specific image region extraction section.

2. The image processing apparatus of claim 1, further comprising a determination section that determines a surface in which exists an image that has generated an offset, on the basis of at least one of the brightness degree in the specific image region of the front face and the rear face, the saturation degree in the specific image region of the front face and the rear face, or an area of at least one of a foreground color region or a background color region when each of the specific image region of the front face and the specific image region of the rear face is divided into a foreground color region including a foreground color and a background color region including a background color.

3. The image processing apparatus of claim 2, further comprising a collation section that collates an image of the specific image region extracted from the surface determined by the determination section, with a predetermined image.

4. The image processing apparatus of claim 1, further comprising a collation section that collates an image of the specific image region with at least one of a predetermined first image or a second image in which the first image is mirror inverted.

5. The image processing apparatus of claim 4, wherein the collation section collates an image of binarized data obtained by binarizing data for the specific image region or an image of color quantized data obtained by limiting the data for the specific image region to a specific color, with at least one of the first image or the second image.

6. The image processing apparatus of claim 1, wherein the specific image region extraction section selects at least one attribute from three attributes including a hue degree, a brightness degree and a saturation degree in accordance with feature information which indicates a feature of an image represented by the read image data, and extracts, as the specific image region, from among the local regions which exist at the corresponding positions of the front face and the rear face of the read image data, a local region in which an amount of difference of the selected attribute between the front face and the rear face is within a predetermined range.

7. The image processing apparatus of claim 1, wherein the specific image region extraction section extracts the specific image region from the read image data on the basis of data other than data for at least one of a background color or a ground color of the document.

8. The image processing apparatus of claim 1, further comprising a color correction section that corrects data of a foreground color in the read image data on the basis of data for a background color in the read image data,
wherein the specific image region extraction section extracts the specific image region on the basis of the read image data which the color correction section has corrected.

9. The image processing apparatus of claim 1, wherein, as the image processing, the image region correction section carries out smoothing processing which smoothes data for the specific image region, carries out binarization processing which binarizes the data after the smoothing processing, and carries out expansion and contraction processing which expands and then contracts a portion expressed by one value of the binary data.

10. The image processing apparatus of claim 1, wherein, as the image processing, the image region correction section carries out reduction processing which reduces data for the specific image region by a reduction method having a smoothing effect, carries out binarization processing which binarizes the data after the reduction processing, and carries out enlargement processing which enlarges a portion expressed by one value of the binary data.

11. The image processing apparatus of claim 1, wherein, as the image processing, the image region correction section carries out division processing which divides data for the specific image region into coupling components into which a plurality of pixels are coupled, carries out extraction processing which extracts data for, from among the coupling components, a coupling component in which at least one of the number of pixels constructing the coupling component, a dimension of the coupling component, or an area of a circumscribed rectangle which circumscribes the coupling component is equal to or more than a predetermined threshold value, and carries out expansion and contraction processing which expands and then contracts data for the extracted coupling component.

12. An image forming apparatus comprising:
a read image acquisition section that acquires read image data which is obtained by reading a front face and a rear face of a document;
a specific image region extraction section that extracts, as a specific image region, from among local regions which exist at corresponding positions of the front face and the rear face of the read image data, a local region in which an amount of difference of at least one of hue degree, brightness degree or saturation degree between the front face and the rear face is within a predetermined range;
a determination section that determines a surface in which exists an image that has generated an offset, on the basis of at least one of the brightness degree in the specific image region of each of the front face and the rear face, the saturation degree in the specific image region of each of the front face and the rear face, or an area of at least one of a foreground color region or a background color region when each of the specific image region of the front face and the specific image region of the rear face is divided into a foreground color region including a foreground color and a background color region including a background color;
a collation section that collates an image of a specific image region extracted from the surface determined by the determination section, with a predetermined image;
an image forming section that forms an image on the basis of the read image data; and
a controller that controls image formation by the image forming section on the basis of results of collation performed by the collation section. and
an image region correction section that corrects the specific image region by carrying out image processing in which a region having an area which is equal to or less than a predetermined area is excluded and a region having an area which is more than the predetermined area is retained, with respect to the specific image region extracted by the specific image region extraction section.

13. The image forming apparatus of claim 12, wherein the predetermined image includes a predetermined first image and a second image in which the first image is mirror inverted, and the collation section collates the image of the specific image region with at least one of the first image or the second image.

14. The image forming apparatus of claim 12, wherein the collation section collates an image of binarized data obtained by binarizing data for the specific image region or color quantized data obtained by limiting the data for the specific image region to a specific color, with at least one of the first image or the second image.

15. A non-transitory computer readable medium storing a program causing a computer to execute an imaging processing, the processing comprising:
acquiring read image data which is obtained by reading a front face and a rear face of a document; and extracting, as a specific image region, from among local regions which exist at corresponding positions of the front face and the rear face of the read image data, a local region in which an amount of difference of at least one of hue degree, brightness degree or saturation degree between the front face and the rear face is within a predetermined range; and
correcting the specific image region by carrying out image processing in which a region having an area which is equal to or less than a predetermined area is excluded and a region having an area which is more than the predetermined area is retained, with respect to the specific image region extracted by the specific image region extraction section.

16. The image processing apparatus of claim 1, wherein the specific image region is a region of an image which generates an offset image and a region of the offset image.

17. The image forming apparatus of claim 12, wherein the specific image region is a region of an image which generates an offset image and a region of the offset image.

18. The non-transitory computer readable medium of claim 15, wherein the specific image region is a region of an image which generates an offset image and a region of the offset image.

* * * * *